US005470079A

United States Patent [19]

LeStrange et al.

[11] Patent Number: 5,470,079

[45] Date of Patent: Nov. 28, 1995

[54] GAME MACHINE ACCOUNTING AND MONITORING SYSTEM

[75] Inventors: Michael M. LeStrange, Brigantine, N.J.; William H. Watson, Reno; Richard C. Raven, deceased, late of Reno, both of Nev., by Barbara B. Raven, administratrix

[73] Assignee: Bally Gaming International, Inc., Las Vegas, Nev.

[21] Appl. No.: 260,587

[22] Filed: Jun. 16, 1994

[51] Int. Cl.[6] .............................. G06F 15/28; A63F 9/24

[52] U.S. Cl. .............................. 273/138 A

[58] Field of Search .............................. 273/138 A, 85 CP; 364/410–412; 194/206–210, 215–217; 235/380, 381

[56] References Cited

U.S. PATENT DOCUMENTS

| | | | |
|---|---|---|---|
| 4,072,930 | 2/1978 | Lucero et al. | 340/152 |
| 4,283,709 | 8/1981 | Lucero et al. | 340/147 |
| 4,689,757 | 8/1987 | Downing et al. | 364/550 |
| 4,764,666 | 8/1988 | Bergeron | 235/380 |
| 5,016,880 | 5/1991 | Berge | 273/138 A |
| 5,038,022 | 8/1991 | Lucero | 235/380 |
| 5,113,990 | 5/1992 | Gabrius et al. | 194/206 |
| 5,179,517 | 1/1993 | Sarbin et al. | 364/410 |
| 5,222,583 | 6/1993 | Bergmann et al. | 194/206 |
| 5,277,424 | 1/1994 | Wilms | 273/85 CP |
| 5,290,033 | 3/1994 | Bittner et al. | 273/138 A |
| 5,321,241 | 6/1994 | Craine | 235/380 |
| 5,326,104 | 7/1994 | Pease et al. | 273/138 A |
| 5,332,076 | 7/1994 | Ziegert | 194/217 |

*Primary Examiner*—Jessica J. Harrison
*Attorney, Agent, or Firm*—Jenner & Block

[57] ABSTRACT

A gaming machine accounting and monitoring system includes a plurality of accumulative, non-resettable accounting meters and an event processor for sensing game activity at the gaming machine and updating the accounting meters in response thereto. The system also includes separate game credit meters for storing the total amount of game credit available and the amount of game credit purchased but not yet risked by the player. The accounting meters include meters for tracking wagering activity and machine payouts, and a plurality of drop meters for tracing monetary value accepted by the gaming machine in all of its different forms. In accordance with another aspect of the invention, the accounting meters also include a set of meters for tracing data card transactions for cashless game play. These data card meters include separate meters for tracking game credit purchased with a data card and gaming machine payouts deposited to a data card account. The accounting system can be used on a variety of gaming machines including video lottery systems which contain multiple games that can be independently selected by the player. In accordance with this aspect of the invention, the system includes a game identifier that uniquely identifies the current game in play, and a mechanism for sensing a change of game at the gaming machine. In response to this change of game event, the system updates the game identifier and saves the accumulations of meter data representing game play for the previous game.

46 Claims, 8 Drawing Sheets

GAME MACHINE ACCOUNTING AND MONITORING SYSTEM

FIELD OF THE INVENTION

The invention relates to gaming machine systems, and more particularly to a system for monitoring gaming machine activity and for providing gaming machine accounting data.

BACKGROUND OF THE INVENTION

Most gambling casinos and other gaming locations contain a large number of gaming machines which typically accept one or more coins as wagers and dispense winnings in coin from a hopper. Because there is a constant inflow and outflow of currency through such machines, it is important to keep careful and accurate records of game activity, such as the total machine payout, the value of wagers placed at the machine and the value of any currency used to purchase credits for wagering. Moreover, gambling regulatory commissions in many jurisdictions require casino operators to keep very specific accounting data with regard to their gaming machines. Therefore, it has been desirable to automate gaming machine accounting to improve reliability and reduce costs.

Traditionally, slot machines and other types of gambling machines accepted and dispensed only coins. For these machines, the game accounting problem is greatly simplified. Coin input by the user always becomes part of game activity, i.e., players risk all of the coins they insert into the machine. Therefore, game activity could be monitored simply by tracking coin inflows and outflows from the machine. In addition, the change in the level of coins in the coin payout hopper, which is impractical to measure directly, could be inferred quite easily by subtracting the sum of the total game outflow and the total number of coins diverted to the game's drop bucket from the total number of coins inserted in the machine. Similarly, the calculation of game win percentage is given by the ratio of coin outflow to coin inflow.

Today, the increased sophistication of gaming machine technology has greatly increased player options. For example, gaming machines have been devised which can accept currency in forms other than coin. An example of a gaming machine that is equipped with a bill acceptor for accepting paper currency is 10 described in U.S. Pat. No. 5,113,990. Indeed, gaming machine technology has advanced to such a stage that it is now possible for gaming machines to accept items of monetary value in forms other than cash. For example, slot machines and video gaming machines are now being built which are equipped with magnetic card readers or smart card readers that can accept monetary credit from a player account stored on casino credit cards, or from the player's commercial credit card. An example of such a gaming machine is disclosed in U.S. Pat. No. 5,038,022. In such machines, winnings can be credited to the card instead of being paid out in coin. Other forms of cashless gaming machines available today include machines that accept bar coded coupons and video lottery machines that offer many games, often of various kinds, within a single cabinet and which pay winnings on printed vouchers issued by the machine.

The addition of these new forms of wagering and payout instruments has greatly complicated the machine accounting problem. For example, it is now possible for a player to input dollar bills or credit from a credit card into a gaming machine and cash out immediately without placing any bets. In this case, the game credit purchased and cashed in by a player has never become part of game activity. Because not all coins dispensed by a gaming machine are the result of game winnings, monitoring game activity is no longer a simple matter of tracing coin outflows and coin inflows. Accordingly, the calculation of hopper level and game win percentage must take into account "vended credits", i.e., credits purchased but not risked The failure to account for vended credits means that game win percentage calculations can be compromised when, for example, a note or credit card acceptor is added to a coin gaming machine. In many of these retrofit installations, when the gaming machine accepts currency other than coin, a meter which counts coin inflows is incremented. Similarly, when the player cashes out, a meter which counts coin outflows is incremented. However, because the player can now collect the credits purchased without risking any of the credits in a wager, the coin outflow meter does not reflect actual game activity. Therefore, the traditional calculation of game win percentage based on the ratio of coin inflow to coin outflow is improperly inflated.

Furthermore, video lottery systems, comprising many different games within a single cabinet, can create problems for typical accounting methods. Ideally, the accounting system should calculate game win percentage for each of the games because the theoretical win percentage may be different for each game. Thus, game accounting data must be maintained separately for each game. One way this has been accomplished is to provide separate accounting meters for each game in the cabinet. However, this solution requires a reconfiguration of the accounting system whenever games are added to the machine or the games within the machine are reordered. Although more flexibility could be added by allocating excess meter sets for each machine, this solution creates undesirable overhead. Moreover, one must still reconfigure the system when the games are reordered.

To further complicate the accounting problem, rules established by many gaming regulatory commissions require that all gaming locations account separately for all of the different forms of monetary value that can be accepted by modern gaming machines. Specifically, most jurisdictions require a complete audit of all wagers found in the coin and currency cash boxes. In machines equipped with coupon readers, the currency box may contain bar coded coupons of varying amounts in addition to cash. In the case of cashless wagers (e.g., those placed from player charge accounts), there may be no physical equivalent in either box. Yet the gaming locations's accounting system must provide an audit trail for each of these betting instruments. In addition, the rules require a separate accounting of the different forms of machine payouts. For example, where machine payouts are in the form of printed vouchers, the vouchers will be redeemed and stored at the redemption locations. Because the vouchers are relatively easy to forge or duplicate, the accounting system must also provide a record of these tickets against which payment can be made. To date, accounting system methodologies do not provide a convenient and unified mechanism for auditing betting activity in all of these different forms.

Therefore, there is a need for a fully general game accounting and monitoring system that keeps accurate game accounting data and maintains audit trails of gaming activity independent of the type of gaming machine and the forms of monetary value used by the gaming machine. In addition, there is a need for a game accounting and monitoring system that can accurately calculate the hopper level and game win percentage based on accounting data for all varieties of gaming machines.

SUMMARY OF THE INVENTION

It is therefore an object of this invention to provide a game accounting and monitoring system and method that overcomes the limitations of the prior art. More specifically, it is an object of the invention to provide a gaming machine monitoring and accounting system and method that records gaming activity regardless of the forms of monetary value used, and also provides accurate accounting data, including accurate totals of hopper level and game win percentage. Furthermore, the accounting methods described herein can be easily adapted for use on traditional gaming machine designs as well as the more advanced gaming machines available today.

In accordance with the present invention, the game monitoring and accounting system includes a plurality of meters for tracking important game quantities and an event processor for sensing the state of the gaming machine and updating the meters accordingly. These meters include several accumulative, non-resettable "drop" meters, one for each of the different forms of monetary value acceptable by the gaming machine, for tracking the total amount of that form of money accepted and, where applicable, returned by the machine. In addition, accumulative game activity meters track the wagers placed and the payouts made, respectively, by each game within the gaming machine. The accounting system will correctly update the game activity meters even for older style gaming machines that may not provide an external signal representing, for example, the total winnings generated by the machine. Consequently, the accounting system can be used with any kind of gaming machine including traditional coin only games as well as the more advanced gaming machines available today.

The system also includes individual credit meters for maintaining both the total game credit purchased by a player and the amount of that game credit that has not yet been risked and thus has not yet become part of game activity. With this information, the event processor can properly maintain the state of a gaming machine that has been retrofitted with a note acceptor or other currency accepting device. For example, when the event processor detects that a dollar bill has been inserted, the amount of the game credit purchase is reflected on both a game credit meter and a residual credit meter to indicate that the credit just purchased has not yet been risked. If the player subsequently cashes out, the event processor will not add the amount of this residual credit to the game activity meter. Therefore, calculations based on game activity such as win percentage and hopper level (which also depends upon the sum of the drop meters) will reflect only the actual betting activity at the machine.

In addition, the accounting system ensures accounting data integrity by associating meter data with gaming machine events. Specifically, the system updates the accounting meters simultaneously with the gaming machine events that resulted in a change of meter state so that there is no latency between events and data. Therefore, the system can correlate changes in important quantities such as game win percentage and coin hopper level to events which caused the change. Furthermore, when the system transmits data to other components within the system, it transmits both accounting and event data in a single message. Therefore, a host computer system can log the data to a database while maintaining the proper relationship between the data and the corresponding state of the gaming machine.

In another aspect of the present invention, an improved method of handling credit card transactions within the gaming machine is provided. The accounting system includes separate credit accumulating meters for keeping track of game credit purchased by a player and amounts collected by a player that are paid to credit card accounts. The difference between the meter values is equivalent to a credit card drop meter. However, by segregating credit purchases from credit payout, a separate audit trail for each type of transaction can be maintained. Furthermore, the system can compute the net effect on credit card balance from the separate credit in and credit out meters and reduce all game activity by the player to a single transaction. As a result, transaction costs can be significantly reduced.

In accordance with yet another aspect of the present invention, the accounting system can be used with video lottery systems which may include many games within a single cabinet. Advantageously, the accounting system maintains data for all of the games using only a single set of accounting meters. The system associates the current meter values with a particular game through an indicator that uniquely identifies the game currently in use. When a player selects a new game in the video lottery system, a change of game event is generated, and in response the system updates the game identifier. Because there is no latency between events and data as described above, when a change of game event occurs, the current meter data can be added to the accumulated accounting data for the previous game. Consequently, the system can maintain records of accounting data for each game in the machine.

Other objects and features of the invention will be apparent from the following description and from the drawings.

DETAILED DESCRIPTION OF THE INVENTION

Figure 1:
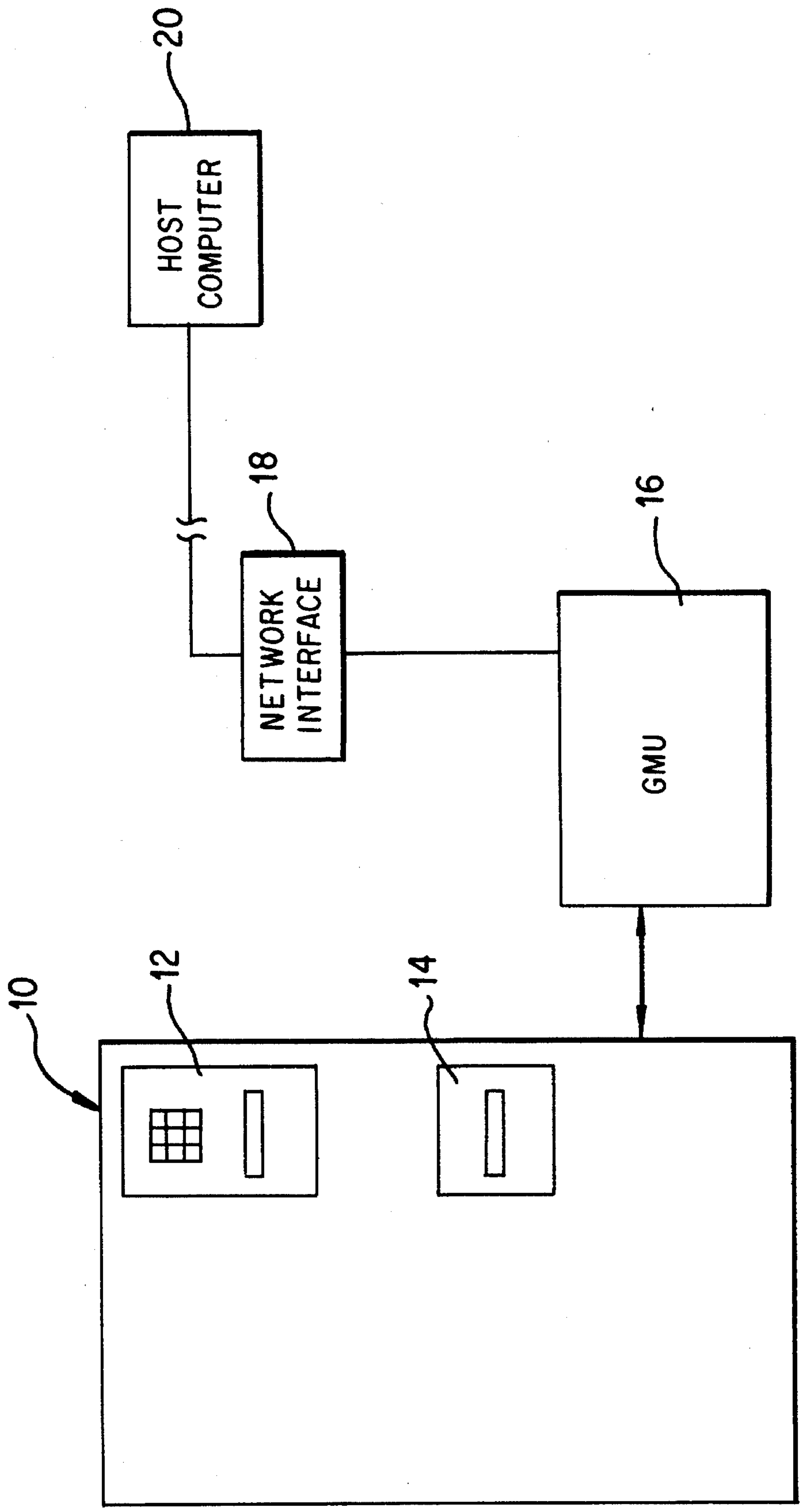
FIG. 1 is a schematic block diagram showing the hardware elements of the system.

FIG. 1 illustrates the preferred embodiment of a gaming machine system in accordance with the present invention. Box 10 represents a gaming machine which includes a structure for accepting currency or the equivalent from a player and for paying out cash or other items of monetary value. The system of the present invention can be used with a variety of different types of gaming machines such as slot machines, video poker games and video lottery systems. Gaming machine 10 can also be configured to accept cash in forms other than coin, and items of monetary value in forms other than cash. For example, gaming machine 10 can be equipped with a multiple card reader and key pad 12 for accepting payment in the form of credit cards, smart cards or other data cards containing player credit accounts. In addition, gaming machine 10 can be equipped with a note or bill acceptor 14 capable of accepting paper money or notes in various denominations or bar coded coupons.

As shown in FIG. 1, in the preferred embodiment the primary hardware elements of the system include a game monitor unit (GMU) 16, a computer network interface 18, and a central or host computer system 20. The game monitor unit 16 collects information from gaming machine 10 and performs game accounting and other monitoring and security functions. GMU 16 transmits accounting data along with information about the current state of gaming machine 10 to the host computer 20 via the network interface 18. The central or host computer 20 may be a personal computer, for example, an IBM RT class or compatible or an Intel 80×86 or Pentium™ processor-based personal computer, or a mini-computer such as a DEC 1184 or IBM RISC 6000, depending on the size of the installation and the number of gaming machines. Central computer 20 may also consist of a network of similar computers linked together. The host computer 20 archives accounting data and customer data in a database, calculates other values and takes actions based on this accounting data and performs security functions based on exceptional events. A more detailed description of a gaming machine system in conformance with FIG. 1 is provided in a co-pending U.S. patent application Ser. No. 07/763,924 filed on Sep. 23, 1991, which is assigned to the assignee of this application, the disclosure of which is hereby incorporated by reference into the present application.

In accordance with the present invention, a monitoring and accounting method and system is provided for use with gaming machine 10. In the preferred embodiment, accounting functions are carried out by GMU 16, which can be a single or multiple circuit board computer which has a micro-processor or microcontroller such as the Motorola BC68HC11 micro-controller. Alternatively, gaming machine accounting functions could be performed by a hardware or firmware subsystem within gaming machine 10 itself. The GMU 16 can be located within gaming machine 10 or remotely, communicating with gaming machine 10 in that case by a communication cable. In addition to performing game accounting, GMU 16 can record transactions and perform maintenance and security functions in connection with gaming machine use.

Figure 2:
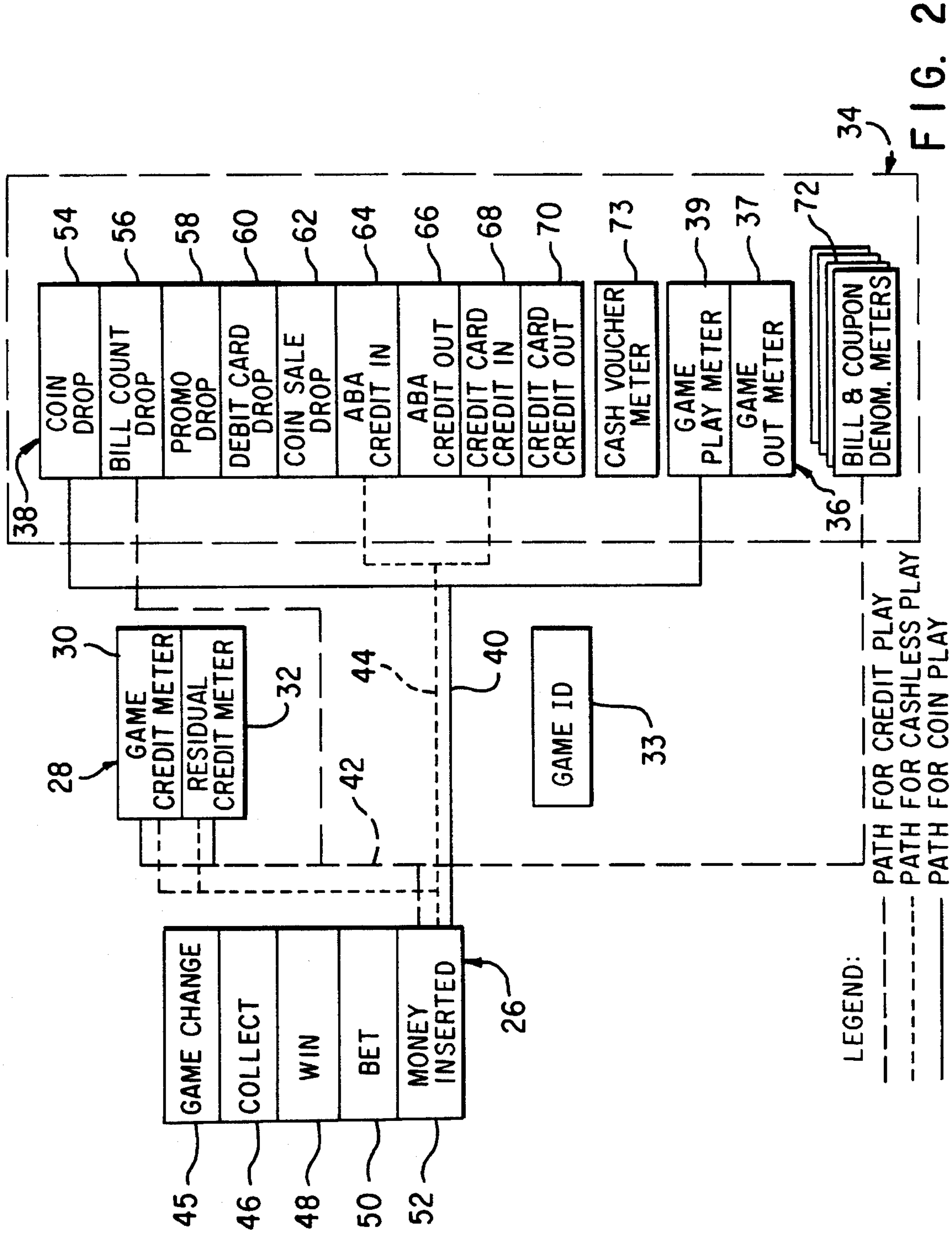
FIG. 2 is a schematic block diagram of the accounting system components.

FIG. 2 shows a schematic block diagram of the game accounting system for use in connection with the present invention. Accounting system comprises a plurality of accounting meters 34, which includes a set of drop meters 38 and game activity meters 36, for tracing all money flows and game activity, respectively, for the particular machine. The accounting meters 34 are non-reset, accumulative meters and thus they establish an audit trail for the various quantities they track. In addition, credit meters 28 monitor game credit and provide separate meters for the total game credit available to the player and the amount of that credit that has not yet been risked. The accounting system also includes a game event processor 26, which responds to a variety of gaming machine events and updates the accounting meters accordingly. The event processor 26 is compatible with a variety of gaming machines, including traditional coin-only machines as well as the more advanced automated cashless versions.

The accounting meters 34 provide a complete record of all gaming activity at the gaming machine. Monetary flows are tracked by a plurality of drop meters 38, one drop meter 38 for each of the different forms of monetary value accepted by gaming machine 10. The coin drop meter 54 is known in the art and represents the total value of coins that have been diverted to a "drop bucket" in the gaming machine cabinet and thus can be collected by the casino. In accordance with the invention, a number of additional "drop" meters are provided that represent monetary value that is collected by the casino in all of its different forms. The drop meters include: a bill count drop meter 56 which counts all paper currency that has been inserted into a note acceptor; a promo drop meter 58, which counts all promotional credits that are received by the gaming machine from any source (including, e.g., credits from coupons or cards issued by the casino or from "bonus points" generated by the machine itself); a debit card drop meter 60, which counts all credits from debit memory cards (i.e., cards which cannot receive additional credit from the gaming machine); and a coin sale drop meter 62, which counts all credits received from a "change person's" memory card, which is inserted into the gaming machine to provide coins for a player in exchange for paper currency.

The accounting meters 34 also include meters for tracking other monetary flows. For example, the bill and coupon denomination meters 72 provide a count of the number of bills of various denominations and the total number and value of bar coded coupons that have been received by the gaming machine. Credit card transactions for cashless game play are tracked in the ABA credit in meter 64, ABA credit out meter 66, credit card credit in meter 68 and credit card credit out meter 70. The difference between the credit in and credit out meters is equivalent to a credit card drop meter. The details of credit card accounting in conformance with the present invention are described below. Finally, for tracking an alternative form of monetary outflow, the cash voucher meter 73 counts the total value of all printed vouchers that have been issued by the machine.

Wagering activity is tracked by a set of game activity meters 36, comprising a game play meter 39 and a game out meter 37, for tracking the total number of bets and wins, respectively, issued by gaming machine 10. These meters represent only the actual wagering activity at the machine and exclude any activity due to, for example, purchased credits that are converted to cash without being wagered.

In addition to the accounting meters, a number of non-accumulative, resettable meters direct the operation of the accounting system. For example, the accounting system maintains a game ID indicator 33 which contains a unique identifier for the game currently in use on a multi-game video lottery system. Moreover, credit meters 28 include a game credit meter 30, which reflects the total amount of credit available to the player at any time, and a residual credit meter 32, which reflects the amount of credit purchased by a player that has not yet been risked and, therefore, is not yet part of game play. This separation of credits purchased and credits risked enables the system to compensate for "vended credits" in the accounting model.

In operation, accounting meter changes are driven by player activity signified by gaming machine "events." GMU 16 receives notification that game events have occurred through event processor 26. Possible events include: coin or other money input by the player 52, wagers placed by the player 50, game wins issued to the player 48, a "collect" event issued by the player signifying the player's desire to withdraw available game credit from the machine 46 and a game change event 45 signifying that a player has requested a change of game at a video lottery machine.

The accounting system preserves data integrity by maintaining a close relationship between gaming machine events and the meter values to which the event pertains. Whenever the system updates meter values, the event which caused the changes is also recorded. Moreover, whenever accounting data is transmitted, for example when GMU 16 sends meter values to host computer 20, an indicator of the event that generated the latest change in the data accompanies the meter values. Thus, the host can record the data in proper temporal relationship to the pertinent game events. This overcomes a disadvantage found in prior systems where separate messages were generated for data and events which created a latency between the data and the event.

Event processor 26 records the events on the game credit meters 28 and accounting meters 34 as indicated by the type of event and the game play mode. For example, a player money insertion event 52 will affect the game credit meters 28 and the accounting drop meters 38 in one way for coin game play (path 40) and in another way for credit game play (path 42) and still another way for cashless game play (path 44). Moreover, a game change event 45 precipitates a different chain of events necessary for handling multi-game gaming machines, such as video lottery systems. The operation of accounting system in each of these modes is discussed in detail below.

COIN GAME PLAY

Figure 3:
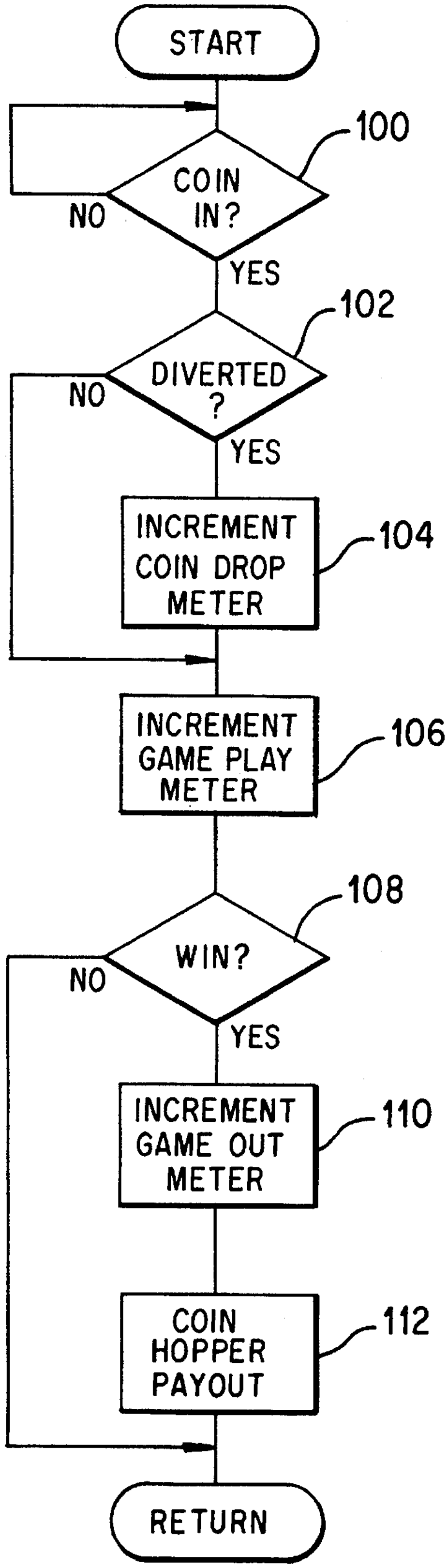
FIG. 3 is a flowchart illustrating the operation of the accounting system during coin game play.

FIG. 3 is a flow chart showing the operation of the accounting system for use with gaming machine 10 in coin game play mode. Coin play is the most traditional game mode. In coin play, the gaming machine 10 accepts coins inserted by the player and channels the coins to a hopper from which game payouts are made or diverts the coins to a "drop bucket" located in the cabinet beneath the gaming machine. Coins that have been diverted to the drop bucket are said to have become part of the machine's "drop," meaning that they will not be paid out and thus are available for collection by casino operators. In this mode, all coins are wagered by the player and automatically become part of game play. Similarly, all winnings are paid to the player in coins from the game hopper.

As shown in FIG. 3, decision block 100 detects the insertion of coins by the player. Subsequently, as coins are input by the player, at block 102 the accounting system determines whether the coins have been diverted to the drop box or accepted in the game's hopper. If diverted, the system increments the coin drop meter 54 at block 104 adding to the sum already located within the drop bucket. As mentioned above, in pure coin mode play, all coin input becomes part of a wager placed by the player. Therefore, at block 106 the system increments the game play meter 39 adding to the total value of bets placed with that particular gaming machine. At decision block 108, the system checks to see if the bet placed by the player resulted in a win. If so, the game out meter 37 is incremented at block 110 adding to the sum of current game payouts from the gaming machine. At block 112, the gaming machine pays the winnings as coin out of the gaming machine's coin hopper. The system then returns to a wait state at decision block 100 waiting subsequent game events.

Although, for convenience, the operation of accounting system is described as a sequential process, it will be appreciated that processing game events can be implemented as an asynchronous process, where accounting system is capable of handling any event as it occurs, independently of preceding events.

CREDIT GAME PLAY

In this mode, gaming machine 10 is capable of accepting currency in forms other than coin and items having monetary value in forms other than cash. For example, gaming machine 10 can be equipped with a bill acceptor 14 for accepting paper currency or bar coded coupons instead of coins. In addition, gaming machine 10 may include a special card reader 12 for accepting promotional tickets or debit cards having a specified dollar amount available for gambling. These tickets or cards can be issued by casinos for promotional events or as a means for limiting the amount of money that a player can gamble in states where the maximum amount is specified by law. In this form of gambling, the player has the option of collecting the amount of credit purchased without placing any amount at risk and, therefore, the amount purchased cannot be reflected immediately in the game play meter 39. Accordingly, the accounting system segregates credit purchased but not risked from other credit available, such as that available from game winnings.

Figure 4A:
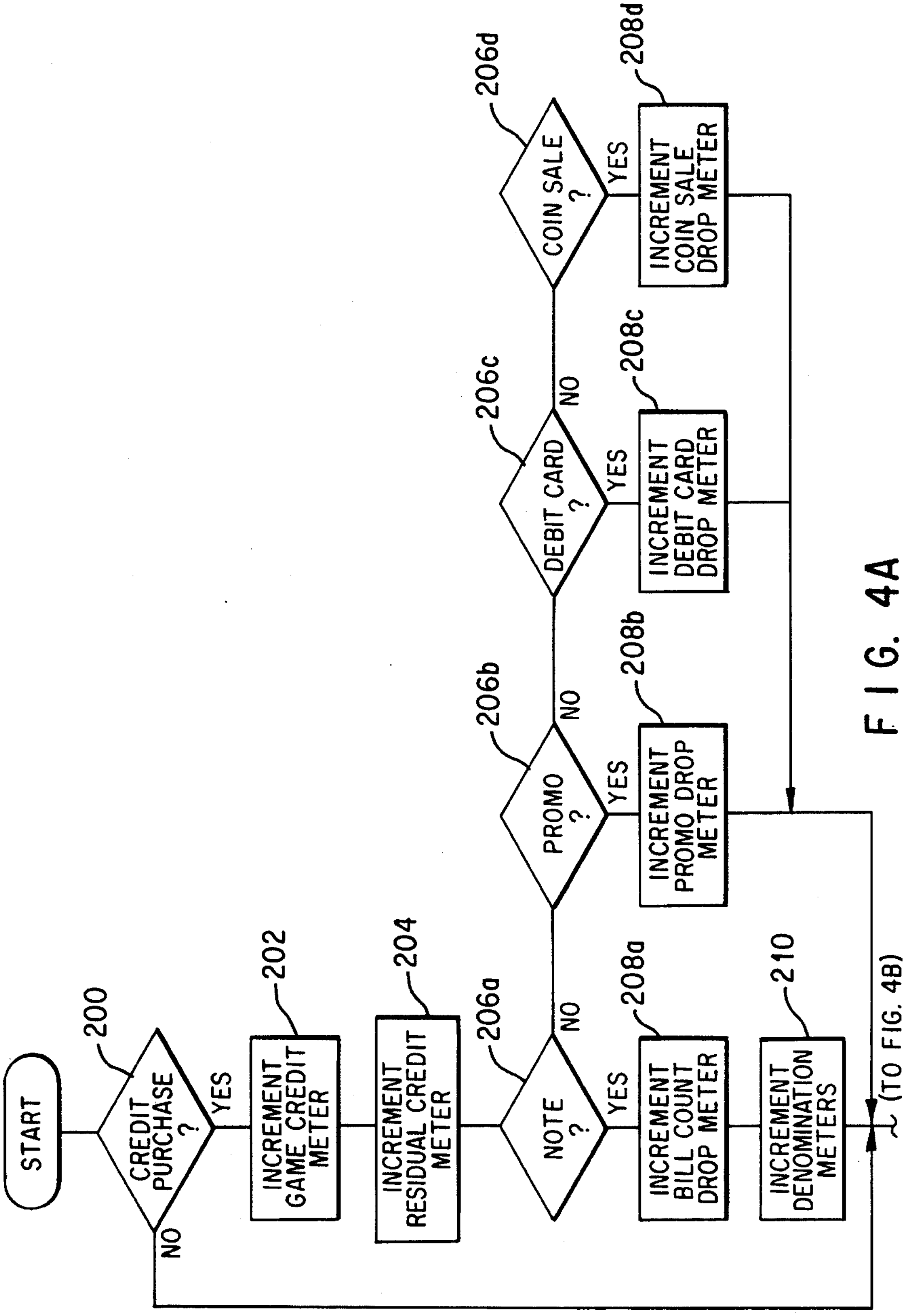
FIG. 4 is a flowchart illustrating the operation of the accounting system during credit game play.
Figure 4B:
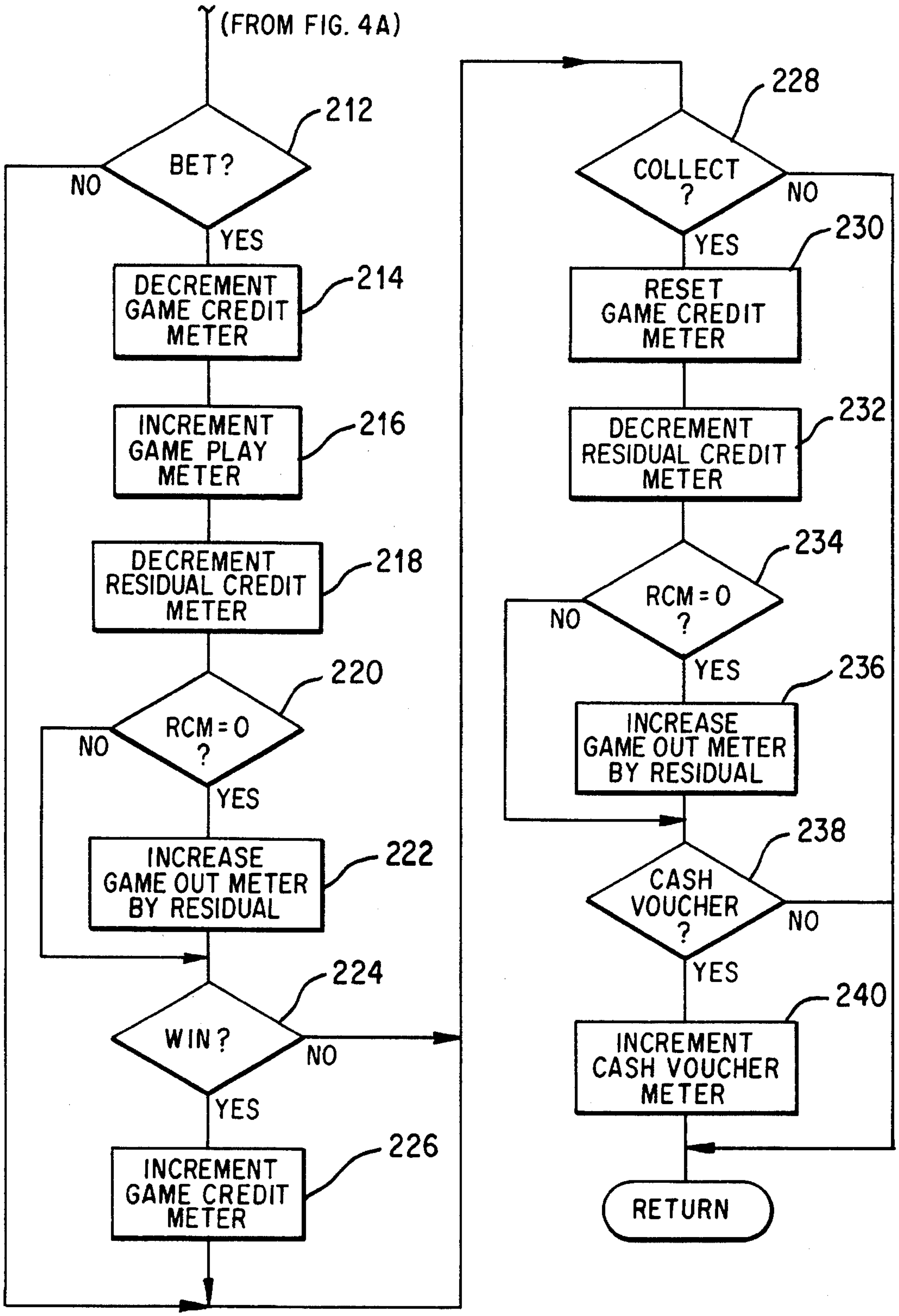

FIG. 4 is a flow chart showing the operation of the accounting system during credit game play. At decision block 200, the system determines if items of monetary value have been inserted by the player. Once this has occurred, the system increments the game credit meter 30 (at block 202) to reflect the newly purchased game credit and also increments the residual credit meter 32 (at block 204) indicating that the credit purchased is not yet part of game play. At decision blocks **206*a*, 206*b*, 206*c*and 206*d*, the accounting system discerns which form of monetary value has been input by the player and increments the bill count, promotional, debit card or coin sale drop meters as appropriate (at blocks 208*a*, 208*b*, 208*c* and 208*d*). If paper currency has been input by the player, the accounting system also records the denomination of the bill inserted on the bill denomination meters 72 at block 210**. If, instead, a bar coded coupon has been inserted, a meter representing the number of coupons accepted is incremented and another meter that tracks total coupon value is increased by the value of the coupon.

At decision block **206*b*, the system determines whether "promotional" credit has been purchased. Usually, this is credit issued to a player by the gaming location as a reward or in connection with a promotional event. Because these credits do not represent income for the casino, they will not be accounted for among the currency or credit card drop meters. Rather, the accounting system will track these credits through the promo drop meter 58 (block 208*b*). It should be noted that in some states bar coded coupons, although often promotional in nature, must be counted as part of the casino's drop. Therefore, in these states the accounting system will accumulate credits from bar coded coupons on the bill count drop meter 56**.

The accounting system of the present invention does not assume that the winnings issued by the gaming machine will be available as an input to the system. Rather, the accounting system calculates game winnings by tracking the amount of residual credit purchased by the player. The amount of game credit in excess of the balance in the residual credit meter 32 represents the total amount of winnings issued by the machine at that time. Therefore, when the player either wagers or collects available game credit, the portion of the wager or the amount collected above the balance in the residual credit meter represents previous game winnings. Accordingly, the game out meter will be increased by this amount.

As shown in FIG. 4, when the player places a wager (at decision block 212), the game play meter 39 is incremented at block 216 and the game credit meter 30 is decremented by the amount of the bet at block 214, signifying that a portion of the credit available to the user has now been risked. At block 218, the amount of each wager is subtracted from the residual credit meter 32 until the balance in the residual credit meter is reduced to 0. After each subtraction, at decision block 220 the balance in the residual credit meter 32 is checked to determine whether it has been reduced to 0. If the residual credit meter has not reached 0, the game out meter 37 will not increase. However, if the residual credit meter has been reduced to 0 by subtracting the amount of the bet, the amount of the wager in excess of the balance in the residual credit meter 32 before subtraction represents prior game winnings. Therefore, the game out meter is incremented by the excess at block 222. Thereafter (if no additional game credit is purchased), all further gambling from the available credit will be out of actual game machine winnings and thus the game out meter 37 will be increased accordingly. If the wager results in further winnings (as determined by decision block 224), the win increases the total game credit available to the player as reflected in the game credit meter 30 (block 226).

At decision block 228, the accounting system determines whether the player has requested a payout of available game credit signified by a collect event. If so, the system decreases the residual credit meter 32 by the balance in the game credit meter 30 until the residual credit meter is reduced to 0 (block 232), as described above, and the game credit meter 30 is reset (block 230). If the residual credit meter 32 is 0 after subtraction (as determined by decision block 234), the amount collected in excess of the balance in the residual credit meter before subtraction reflects the amount of prior wins issued by the machine. Therefore, the game out meter 37 is increased by the excess amount at block 236. The mode of gaming machine payout is determined at decision block 238. If the machine pays out in the form of a printed voucher, the system increments the cash voucher meter by the amount collected by the player (i.e., the balance in the game credit meter 30 before it was reset) at block 240. Otherwise, the gaming machine pays out this sum from the coin hopper and the accounting system need not take any action. The system then resets waiting for further game activity from the player.

The accounting system in accordance with the present invention is fully general and can accurately determine the state of all known kinds of gaming machines including traditional coin only games that have been retrofitted to accept cash in other forms. By separating the amount of game credit purchased that has not yet been risked in the manner described above, the accounting system can provide accurate calculations of game percentage and changes in coin hopper level without the necessity of metering winnings and coin discharge, which is unavailable on some gaming machines.

Specifically, game win percentage is given by the following expression:

$$\text{Game Percentage} = \frac{\text{total winnings paid out (Game Out Meter)}}{\text{total game play (Game Play Meter)}}$$

Similarly, the change in coin hopper level over time is given by the following expression:

$$\text{Change in Hopper Level} = \text{Total game play (Game Play Meter)} - \text{total payouts (Game Out Meter)} - \Sigma \text{ all drop meters}$$

CASHLESS GAME PLAY

In accordance with another aspect of the invention, the accounting system supports completely cashless gaming in several different formats. In cashless game play, gaming machine 10 is equipped with a data card reader 12 for accepting special game play cards or smart cards issued by casinos, in addition to players' commercial credit cards issued by banks, such as Visa™, Mastercard™ or American Express™ cards (i.e., ABA cards). In addition, the gaming machine could be equipped with coupon or promotional ticket readers for accepting these forms of game credit. As with the credit game play mode described above, in cashless game play, game credit can be purchased from player accounts contained on these cards. However, in contrast with credit play, winnings from gambling activity and residual credits collected by the player can be returned as credits directly to player charge accounts. Among the advantages of cashless gaming are that the player need not carry large amounts of cash or obtain change in the correct denominations for each type of machine he wishes to play. In addition, a gaming machine without a coin hopper or change handling system can be used thereby simplifying gaming machine design, reducing maintenance on the machine and reducing the cost of the machine. As a result, the operators of the gaming location enjoy increased operational efficiencies.

Figure 5A:
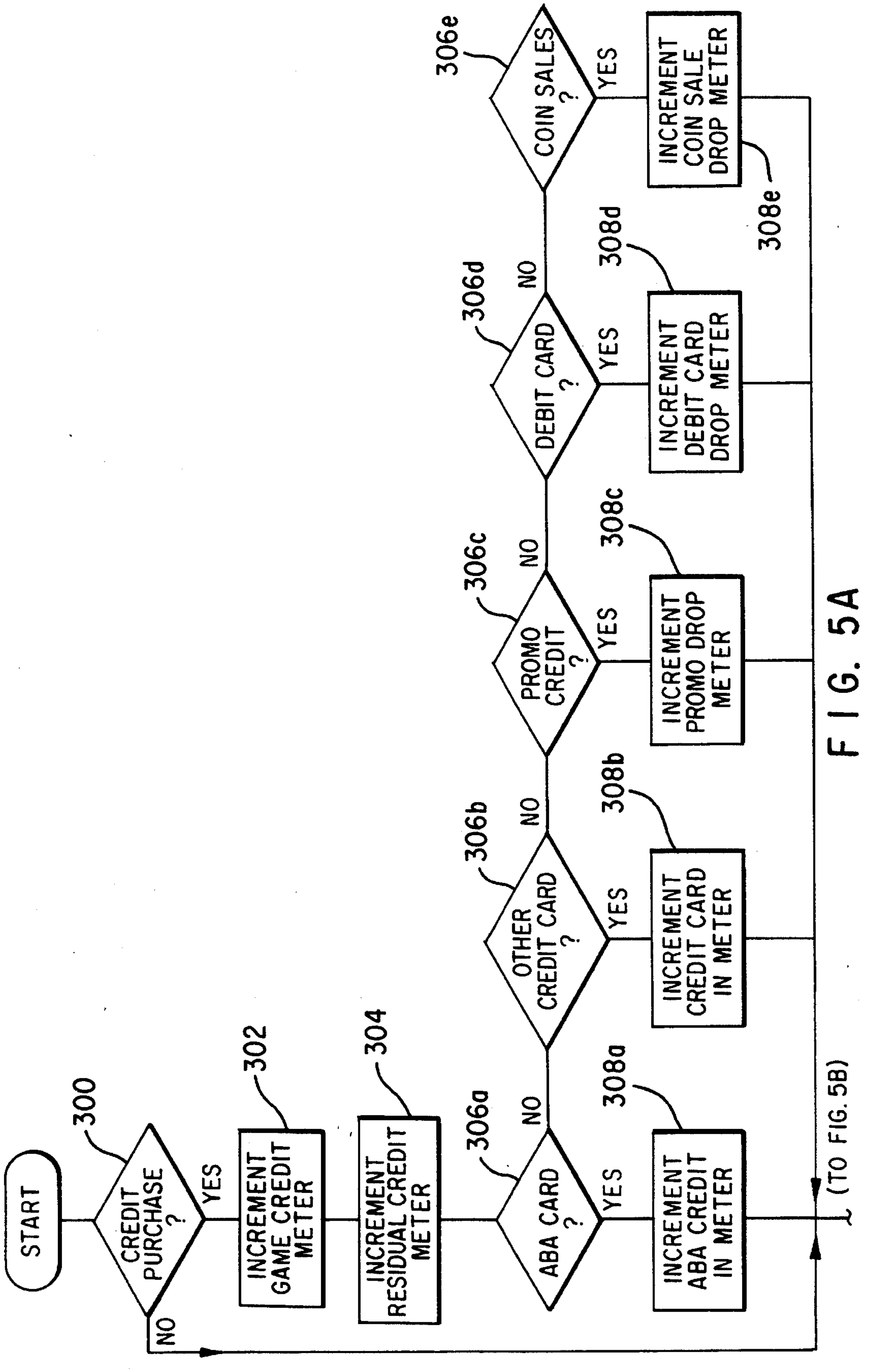
FIG. 5 is a flowchart illustrating the operation of the accounting system during cashless game play.
Figure 5B:
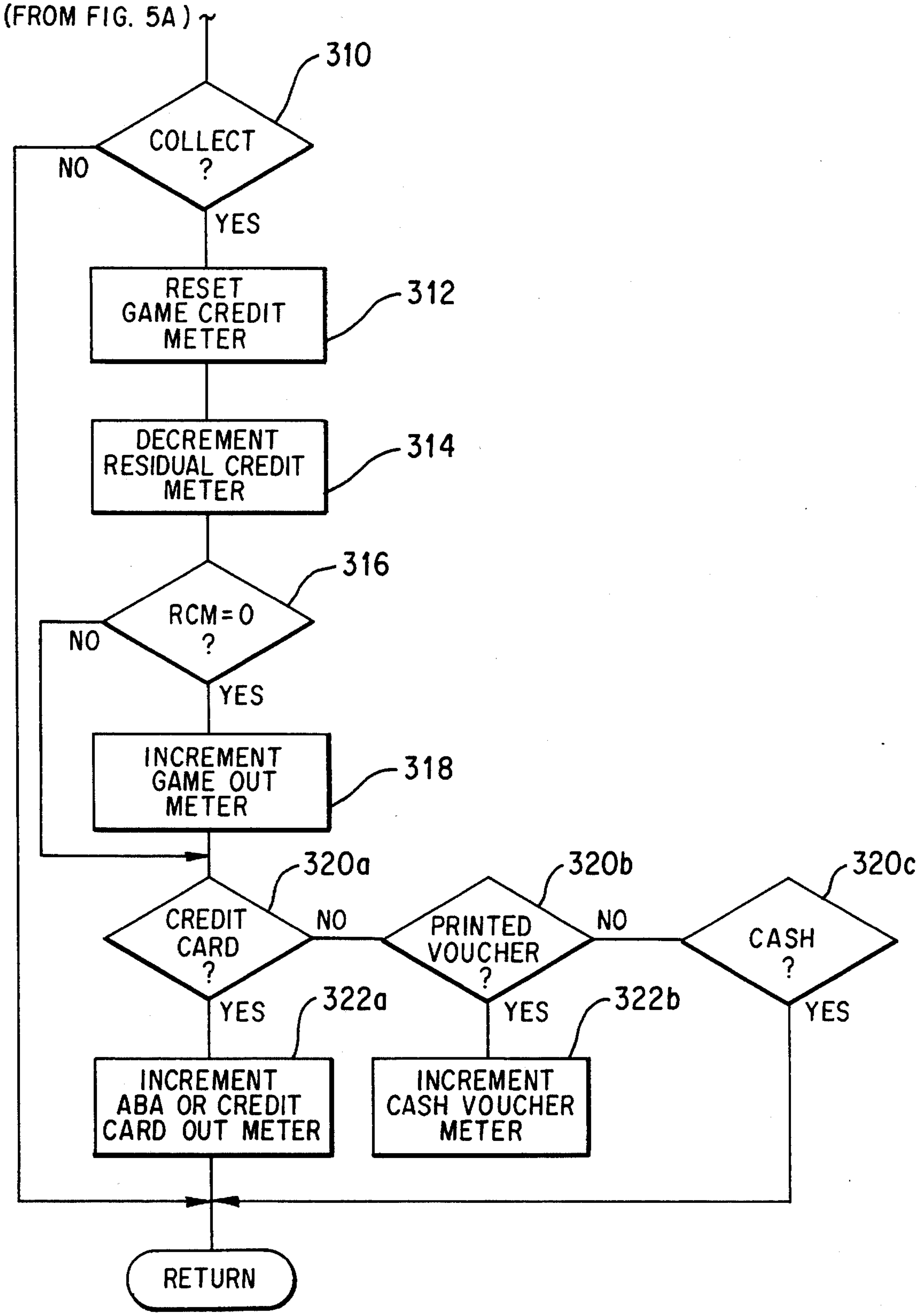

The operation of the accounting system in cashless game play is described with reference to the flowchart of FIG. 5. As above, at decision block 300 the accounting system first determines whether game credit has been purchased by the player by insertion of a valid credit card or casino player credit card. In response, at blocks 302 and 304 respectively, the game credit meter 30 is increased and the residual credit meter 32 is increased to reflect the amount of credit purchased but not yet risked. Next, decision blocks **306*a*, 306*b*, 306*c*, 306*d*and 306*e* determine the type of wagering instrument by the player. If an ABA credit card has been inserted, the amount of the purchase is reflected in the ABA credit in meter 64 (at block 308*a*). If, on the other hand, a casino issued data card has been inserted, the amount of the purchase is reflected in the credit card credit in meter 68 (at block 308*b*). Other non-cash wagering instruments, for example, promotional credits, debit cards and coin sale service, are recorded as in credit game play by incrementing the promo drop meter 58 (block 308*c*), the debit card drop meter 60 (block 308*d*), or the coin sale drop meter 62 (block 308*e***), respectively.

The actions taken for wagers and game wins are the same as described above. Namely, for wagers, the game play meter 39 is increased, the game credit meter 30 is decreased, the residual credit meter 32 is decreased and the excess of the wager over the previous balance in the residual credit meter, if any, is added to the game out meter 37 so that the game out meter tracks the amount of prior wins. For player wins, the game credit meter 30 is increased. As above, by segregating credits purchased from game activity (i.e., bets and wins), the accounting system enables accurate calculations of the state of the gaming machine at any point in time.

"Collect" events, however, result in different actions. If the player requests a payout of the available game credit (as determined by collect decision block 310), the accounting system subtracts the amount of the available credit from the balance in the residual credit meter 32 (at block 314) until the residual credit meter is reduced to 0. If the residual credit meter has been reduced to 0, the system then increases the game out meter 37 by the excess of the amount collected over the previous balance in the residual credit meter, if any (as determined by decision block 316), and resets the game credit meter 30 at block 312 as was done during credit game play described above. However, in contrast with traditional coin hopper machines, in cashless gaming the machine may support several forms of payouts to the player. Accordingly, at blocks 320*a*, 320*b* and 320*c* the accounting model determines the form of payout made by the gaming machine. If the payout is to be added to the balance on the player's ABA or casino credit card account (decision block 320*a*), the accounting system stores this amount in the ABA credit out meter 66 or the credit card credit out meter 70, respectively, at block 322*a*. If, instead, the payout is to be in the form of a printed voucher (decision block 320*b* ), the system increments the cash voucher meter 73 at block 322*b* as the ticket is printed. Finally, if the payout is to be made from the coin hopper (decision block 320*c*), the accounting system need not take any action.

An important benefit of the invention is the separate metering of game credit purchases and game payouts to player credit card accounts. Gaming location operators, as merchants in a commercial credit card system, pay a percentage of each credit card transaction with its customers. By separating credit purchases and payouts in the credit card in 64 and credit card out 70 meters, respectively, a series of bets by the player can be reduced to a single net transaction, thereby saving considerable transaction costs.

For example, if a player initially purchases $100 in game credit and gambles until the credit is reduced to $80, the player's card will show a single purchase debit of $20 and, thus, the gaming locating pays a percentage of only this amount. The costs incurred are considerably less than in the alternative where the operators must pay a percentage of the entire $100 initial purchase of credit. Furthermore, by providing credit card meter data to the host computer 20 along with information stored on the card that identifies the player, the computer can calculate a daily balance for each player so that all player credit card activity occurring on that day is reduced to a single transaction.

In addition, by segregating credit purchases from payouts reflected in the credit in and out meters, respectively, accounting system can provide a separate audit trail for each type of transaction. This information would not be available if only a single drop meter were used. Nevertheless, the difference between the credit card (or ABA) in and credit card (or ABA) out meters is equivalent to a "drop" meter for credit card transactions, which allows the gaming location to track net income derived from these sources.

VIDEO LOTTERY SYSTEM PLAY

In accordance with another aspect of the invention, the accounting system supports accounting of multiple games within a single gaming machine, which is common in video lottery systems. Significantly, multiple game accounting is accomplished using only one set of accounting meters for each multi-game machine. Two developments make this possible. First, the accounting system maintains a game ID register 33, which stores a unique identifier representing the current game in play. Second, when the player selects a different game a game change event 45 is generated. In response to the game change event 45, event processor 26 updates the game ID register 33 and invokes a context switch which enables the accounting system to track game activity on a per game basis. In the preferred embodiment, the accounting system will also check periodically the current ID of the game being played at the gaming machine. This provides a recovery mechanism in the event that a game change event is lost. As a result, the system can generate a game change event 45 if the game ID in register 33 does not match the game ID of the current game in play.

In the preferred embodiment, GMU 16 reports events along with accounting data at the time of the event to host computer 20. As discussed above, the accounting system ensures that accounting data is synchronized with gaming machine events such that meter data accurately reflects the state of gaming machine 10. When a game change event 45 occurs, GMU 16 transmits a game change message to host computer 20. The meter data that accompanies that message represents the last meter values for the previous game. Therefore, the difference in meter values between successive game change messages represents all the activity that occurred while the previous game was played. This allows the host computer 20 to maintain accumulations of meter data for each game available on the multi-game machine.

Figure 6:
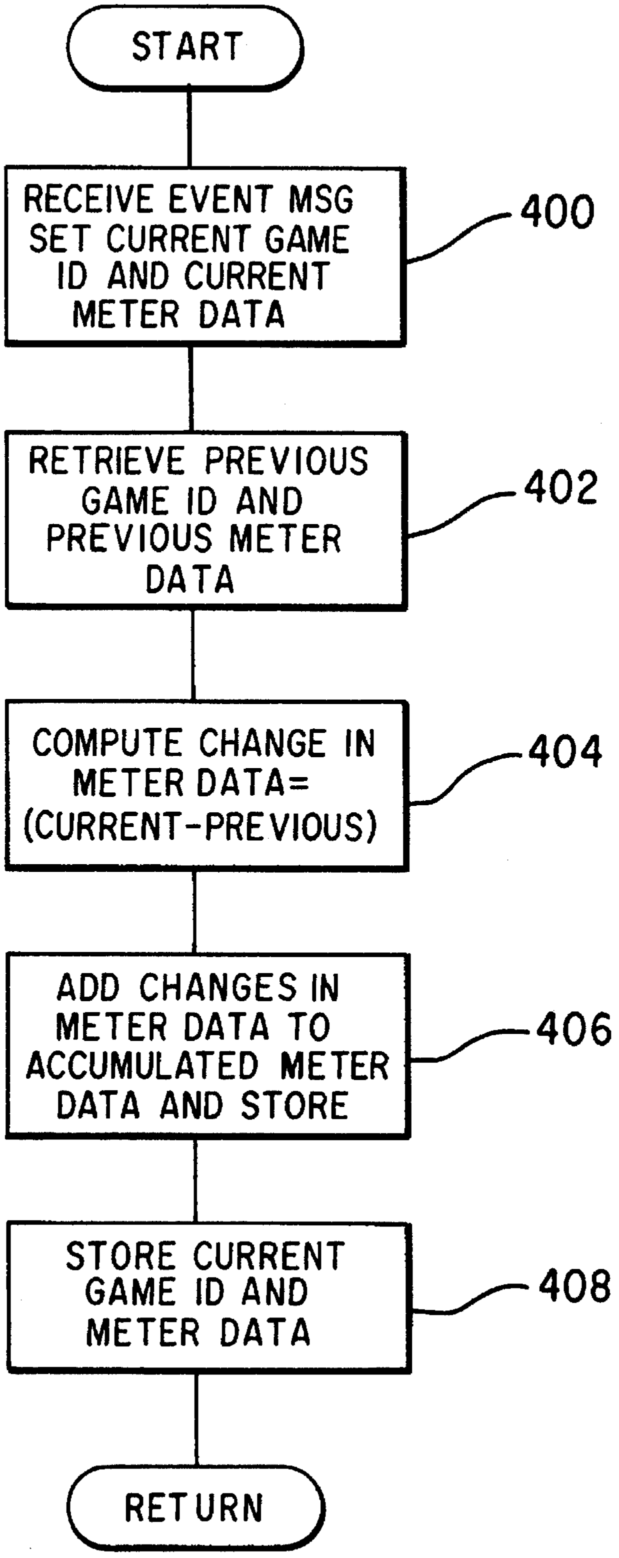
FIG. 6 is a flowchart illustrating the operation of the accounting system when a game change event has occurred.

FIG. 6 is a flowchart illustrating the actions taken on the occurrence of a game change event 45. At block 400 the host receives the game change message and extracts from the message the current game ID and the meter values at the time of the event. At block 402 the host recalls the previous values of game ID and meter data from memory. The change in meter values since the last game change is computed at block 404. The host then adds these changes to the accumulated meter values for the previous game that the host has stored in its memory at a location corresponding to the previous game ID (block 406). Finally, at block 408 the context switch is completed when the host stores the current game ID and current meter values in memory, writing over the previous values stored there.

It will be appreciated that a variety of hardware configurations are capable of performing the actions described above. Although the actions taken have been described in reference to the embodiment illustrated in FIG. 1, many other hardware configurations are possible. For example, the actions of the GMU 16 and the host computer 20 could be performed by a subsystem within the gaming machine itself.

A specific embodiment of the invention for use with gaming machines in a casino has been described for purposes of illustrating the manner in which the system may be used. It should be understood that implementation of other variations and modifications of the invention and its various aspects will be apparent to those skilled in the art, and that the invention is not limited to the specific embodiments described. It is therefore contemplated to cover by the present invention any and all modifications, variations and equivalents that fall within the true scope and spirit of the basic underlying principles disclosed and claimed herein.

We claim:

1. An accounting and data collection system for a gaming machine adapted to accept game credit purchases and wagers from a player using one or more forms of monetary value, to generate game winnings or losses in response thereto and to dispense available game credit collected by the player in one or more forms of monetary value, comprising:

means for storing the amount of residual game credit purchased corresponding to credit purchased which has not yet been risked by the player;

means for tracing game activity within said gaming machine including the total wagers accepted and the total winnings paid to the players of said gaming machine; and event processing means for sensing gaming machine events including the amount and form of game credit purchase and the amount of a wager by the player and having means for updating said residual credit storing means when game credit is purchased, when a wager is placed and when credit is collected by the player and incrementing Said game activity tracing means by the amount of credit collected in excess of the amount of residual credit available to the player.

2. The system of claim 1 further comprising means for computing the winning percentage of said gaming machine from the current state of said game activity tracing means.

3. The system of claim 1 further comprising monetary value tracing means for tracing the total value of all forms of monetary value accepted or dispensed by said gaming machine.

4. The system of claim 3 wherein said gaming machine includes a coin or token hopper for dispensing available game credit collected by the player and further comprising means for computing the current level of coins or tokens in said hopper from the current state of said game activity tracing means and said monetary value tracing means.

5. The system of claim 3 wherein said monetary value tracing means comprises a plurality of accumulative drop meters for tracing the total amount of each type of currency or other items of monetary value accepted by said gaming machine.

6. The system of claim 5 wherein said drop meters include a paper currency drop meter for tracing the amount of paper currency accepted by the gaming machine and further comprising bill denomination meters for tracing the total amount of each denomination of paper currency accepted by the machine.

7. The system of claim 5 wherein said drop meters include a promotional credit drop meter for tracing the total amount of promotional credit on various forms of wagering instruments accepted by the gaming machine.

8. The system of claim 5 wherein said drop meters include a debit card drop meter for tracing the amount of game credit purchased by a debit memory card inserted into the gaming machine.

9. The system of claim 5 wherein said drop meters include a coin sale drop meter for tracing the total amount of credits purchased by a coin sale data card.

10. The system of claim 3 wherein said monetary value tracing means includes meters for tracing the total value of bar coded coupons accepted by the gaming machine and the number of bar coded coupons accepted by the gaming machine.

11. The system of claim 3 wherein said gaming machine includes means for accepting a data card containing game credit available from a player account and wherein said monetary value tracing means includes a meter for tracing the amount of game credit purchased from the player account on the data card and a meter for tracing the amount deposited to the player account on said data card by said gaming machine.

12. The system of claim 3 wherein said monetary value tracing means includes accumulative meters for tracing the total amount of each type of currency or other items of monetary value that is paid out by said gaming machine.

13. The system of claim 12 wherein said gaming machine includes means for printing a cash voucher representing a cash value and wherein said monetary value tracing means includes a cash voucher meter for tracing the total amount of cash value dispensed by said gaming machine in the form of printed vouchers.

14. The system of claim 1 further comprising means for synchronizing gaming machine events with the state of said credit storing means, said game activity tracing means and said monetary value tracing means.

15. The system of claim 14 further comprising a game monitor unit operatively connected to said gaming machine wherein said event processing means and at least a portion of said game credit storing means, said game activity tracing means and said monetary value tracing means reside on said game monitor unit.

16. The system of claim 15 further comprising a communication means for transmitting the state of said game activity tracing means and said monetary value tracing means and information representing the event corresponding to said states to a computing system that is operatively connected to one or more of said gaming machines or said game monitor units or both.

17. The system of claim 14 wherein said gaming machine comprises multiple individual games which may be selected by the player and further comprising:

means for storing a game identifier for associating the current state of said credit storing means, game activity tracing means and said monetary value tracing means with a particular game being played on said gaming machine; and means for sensing a change of game event in said gaming machine and updating said game identifier means and storing the total game activity and monetary value flows for the previous game in response thereto.

18. An accounting and data collection system for a gaming machine having means for accepting a data card for engaging in game credit transactions with a player comprising:

means for storing the amount of residual game credit purchased corresponding to credit purchased which has not yet been risked by the player;

means for tracing the total amount of game credit purchased by all data cards accepted by said gaming machine;

means for tracing the total amount deposited to all data cards accepted by said gaming machine; and event processing means for sensing the amount of game credit purchased from said data card by a player and incrementing said residual credit storing means and said data card purchase tracing means by the amount of the purchase and sensing the amount deposited by said gaming machine onto said data card and updating said data card deposit tracing means.

19. The system of claim 18 wherein said data card purchase tracing means comprises an accumulative meter for tracing the total amount of game credit purchased by all data cards and said data card deposit tracing means comprises an accumulative meter for tracing the amount of credit deposited on all data cards accepted by said gaming machine.

20. The system of claim 18 further comprising means for tracing game activity within said gaming machine including the total wagers placed at said gaming machine and the total winnings paid by said gaming machine and wherein said event processing means further comprises means for sensing the amount of a wager placed by the players and means for decrementing said residual credit storing means by the amount of said wager and the amount deposited to said data card and incrementing said game activity tracing means by the amount deposited onto said data and that is in excess of the amount of residual credit available to the player.

21. The system of claim 20 wherein said gaming machine is adapted to accept game credit purchases using a variety of forms of monetary value and further comprising monetary value tracing means for tracing the total value of each form of monetary value that is accepted or dispensed by said gaming machine.

22. The system of claim 21 wherein said monetary value tracing means comprises a plurality of accumulative drop meters for tracing monetary inflows to said gaming machine and a set of accumulative meters for tracing monetary outflows from said gaming machine.

23. The system of claim 21 wherein said gaming machine is adapted to dispense coins or tokens stored in a coin or token hopper and further comprising means for computing the current level of coins or tokens in said hopper from the current state of said game activity tracing means, said data card purchase tracing means, said data card deposit tracing means and said monetary value tracing means.

24. The system of claim 20 further comprising means for computing the winning percentage of sid gaming machine from the current state of said game activity tracing means.

25. The system of claim 20 wherein said game activity tracing means comprises a pair of accumulative game activity meters for tracing the gambling and payout activity, respectively, of said gaming machine.

26. The system of claim 20 further comprising means for synchronizing gaming machine events with the state of said credit storing means, said game activity tracing means, said data card transaction tracing means and said monetary value tracing means.

27. The system of claim 26 further comprising a game monitor unit operatively connected to said gaming machine wherein said event processing means and at least a portion of said credit storing means, said game activity tracing means, said data card transaction tracing means and said monetary value tracing means reside on said game monitor unit.

28. The system of claim 27 further comprising a communication means for transmitting the state of said game activity tracing means, said data card transaction tracing means, said monetary value tracing means and an identifier for the event corresponding to said states to a computing system that is operatively connected to one or more gaming machines or game monitor units or both.

29. The system of claim 26 wherein said gaming machine comprises multiple individual games which may be selected by the player and further comprising:

means for storing a game identifier for associating the current state of said game credit storing means, said game activity tracing means, said monetary value tracing means and said data card transaction tracing means with a particular game being played on said gaming machine; and means for sensing a change of game event in said gaming machine and updating said game identifier means and storing the total game activity, monetary value and data card transaction tracing means for the previous game in response thereto.

30. A system for monitoring the activity of and providing accounting data for a multiple game gaming machine comprising:

a plurality of accounting meters for accumulating game activity and the total amount of monetary value accepted and paid out by said gaming machine;

a register for storing an identifier for the game currently in play at said gaming machine; and computing means for sensing the activity at said gaming machine and updating the accounting meters in response thereto and further comprising means for sensing a change of game at said gaming machine and updating said game identifier and saving the state of said accounting meters representing game play for the previous game in response thereto.

31. The system of claim 30 further comprising means for storing the amount of game credit purchased but which has not yet been risked by the player.

32. An accounting and data collection system for a gaming machine adapted to accept game credit purchases and wagers from a player using one or more forms of monetary value generating game winnings or losses in response thereto, and to dispense available game credit in one or more forms of monetary value when collected by the player, comprising:

a plurality of accumulative, non-resetable drop meters for tracing all forms of monetary value accepted by said gaming machine;

a plurality of accumulative, non-resetable game activity meters for tracing the total value of wagers accepted and total value of currency dispensed by said gaming machine;

a residual credit meter for storing the current value of credit available to the player that has not yet been risked;

communication means for transmitting event data associated with gaming machine events including the amount of game credit purchased, the form of monetary value used to purchase the game credit, the amount of a wager placed at the gaming machine and the amount dispensed by the gaming machine; and a processor for receiving said event data from said communication means and changing the state of said drop meters, said game activity meters and said residual credit meter in response thereto, wherein said processor includes means for increasing said residual credit meter by the amount of the game credit purchased by the player.

33. The system of claim 32 wherein said processor includes means for decreasing said residual credit meter by the amount dispensed by said gaming machine and increasing said game activity meter by the amount dispensed in excess of the residual credit available to the player.

34. The system of claim 33 wherein said gaming machine is adapted to dispense available game credit in coin or token from a coin or token hopper and wherein said processor includes means for computing the level of coins or tokens in said hopper at any point in time from the state of said game activity meters and said drop meters.

35. The system of claim 32 further comprising a game credit meter for storing the total game credit available to the player of said gaming machine.

36. The system of claim 32 wherein said drop meters include a paper currency drop meter for tracing the amount of paper currency accepted by the gaming machine.

37. The system of claim 32 wherein said drop meters include a promotional credit drop meter for tracing the total amount of promotional credit on various forms of wagering instruments accepted by the gaming machine.

38. The system of claim 32 wherein said drop meters include a debit card drop meter for tracing the amount of game credit purchased by a debit memory card inserted into the gaming machine.

39. The system of claim 32 wherein said drop meters include a coin sale drop meter for tracing the total amount of credits purchased by a coin sale data card.

40. The system of claim 32 wherein said drop meters include a drop meter for tracing the total value of bar coded coupons accepted by the gaming machine and a drop meter for tracing the number of bar coded coupons accepted by the gaming machine.

41. The system of claim 32 further comprising a meter for tracing the amount of game credit purchased via a data card inserted into the gaming machine and a meter for tracing the amount deposited to said data card by said gaming machine.

42. The system of claim 32 further comprising a cash voucher meter for tracing the total amount of payouts in the form of printed vouchers issued by gaming machines.

43. The system of claim 32 further comprising means for synchronizing gaming machine events with the current state of said drop meters and said game activity meters.

44. The system of claim 43 wherein said synchronizing means comprises means for storing an indicator of the gaming machine event that is associated with the current state of said drop meters and said game activity meters.

45. The system of claim 44 further comprising:

a host computer system;

an interface between said processor and said host computer system for transmitting the current state of said drop meters, said game activity meters and said gaming machine event indicator to said host computer system.

46. The system of claim 43 wherein said gaming machine comprises multiple individual games which may be selected by the player and further comprising:

means for storing a game identifier for associating the current state of said credit storing means, game activity tracing means and said monetary value tracing means with a particular game being played on said gaming machine; and means for sensing a change of game event in said gaming machine and updating said game identifier means and storing the current state of said game activity meters and said drop meters for the previous game in response thereto.

* * * * *

UNITED STATES PATENT AND TRADEMARK OFFICE

CERTIFICATE OF CORRECTION

PATENT NO. : 5,470,079

DATED : November 28, 1995

INVENTOR(S) : Michael M. LeStange

It is certified that error appears in the above-indentified patent and that said Letters Patent is hereby corrected as shown below:

Column 1, line 48, delete "10"

Column 13, Claim 1, line 13, delete "Said" and insert -- said --

Column 15, Claim 24, line 25, delete "sid" and insert -- said --

Signed and Sealed this

Twenty-eighth Day of May, 1996

Attest:

Bruce Lehman

BRUCE LEHMAN

*Attesting Officer*

*Commissioner of Patents and Trademarks*